USOO5920362A

United States Patent [19]
Lee

[11] Patent Number: 5,920,362
[45] Date of Patent: Jul. 6, 1999

[54] METHOD OF FORMING THIN-FILM TRANSISTOR LIQUID CRYSTAL DISPLAY HAVING A SILICON ACTIVE LAYER CONTACTING A SIDEWALL OF A DATA LINE AND A STORAGE CAPACITOR ELECTRODE

[75] Inventor: Joo-hyung Lee, Seoul, Rep. of Korea

[73] Assignee: Samsung Electornics Co., Ltd., Rep. of Korea

[21] Appl. No.: 08/895,464

[22] Filed: Jul. 16, 1997

[30] Foreign Application Priority Data

Jul. 23, 1996 [KR] Rep. of Korea ............... 1996-29866

[51] Int. Cl.[6] .................................................. G02F 1/1343
[52] U.S. Cl. ................................ 349/38; 349/42; 349/187
[58] Field of Search ................................ 349/38, 42, 187

[56] References Cited

U.S. PATENT DOCUMENTS 5,496,749  3/1996  Nasu et al. ................................ 437/40
5,784,131  7/1998  Kim et al. ................................ 349/39

Primary Examiner—William L. Sikes
Assistant Examiner—Robert J. Hollingshead
Attorney, Agent, or Firm—Myers Bigel Sibley & Sajovec

[57] ABSTRACT

Methods of forming thin-film transistor liquid crystal display devices include the steps of forming a semiconductor active layer on a face of a transparent substrate and then forming a gate electrode insulating layer on the semiconductor active layer. The gate electrode insulating layer is then patterned to expose a first portion of the semiconductor active layer. A gate electrode is also formed on the gate electrode insulating layer, opposite the semiconductor active layer. In addition, a pixel electrode is formed to be electrically coupled to the exposed first portion of the semiconductor active layer. Preferably, the steps of forming the gate electrode and pixel electrode are performed simultaneously by forming a transparent conductive layer on the patterned gate electrode insulating layer and then patterning the transparent conductive layer to define a transparent gate electrode and a transparent pixel electrode. The transparent conductive layer may comprise a material selected from the group consisting of indium tin oxide (ITO) and zinc oxide (ZnO). Dopants of first conductivity type are also preferably implanted into the semiconductor active layer, using the gate electrode and the pixel electrode as an implant mask, and then a laser annealing step is performed to recrystallize the channel portion of the active layer and activate the dopants in the source and drain regions.

30 Claims, 5 Drawing Sheets

METHOD OF FORMING THIN-FILM TRANSISTOR LIQUID CRYSTAL DISPLAY HAVING A SILICON ACTIVE LAYER CONTACTING A SIDEWALL OF A DATA LINE AND A STORAGE CAPACITOR ELECTRODE

FIELD OF THE INVENTION

The present invention relates to methods of forming display devices and display devices formed thereby and more particularly to methods of forming liquid crystal display devices and devices formed thereby.

BACKGROUND OF THE INVENTION

At present, the dominant methods for fabricating liquid crystal display devices (LCD) and panels are the methods based on amorphous silicon (a-Si) thin film transistor (TFT) technologies. Using these technologies, high quality image displays of substantial size can be fabricated using low temperature processes. As will be understood by those skilled in the art, conventional LCD devices typically include a transparent (e.g., glass) substrate with an array of thin film transistors thereon, pixel electrodes, orthogonal gate and data lines, a color filter substrate and liquid crystal material between the transparent substrate and the color filter substrate.

Figure 1A:
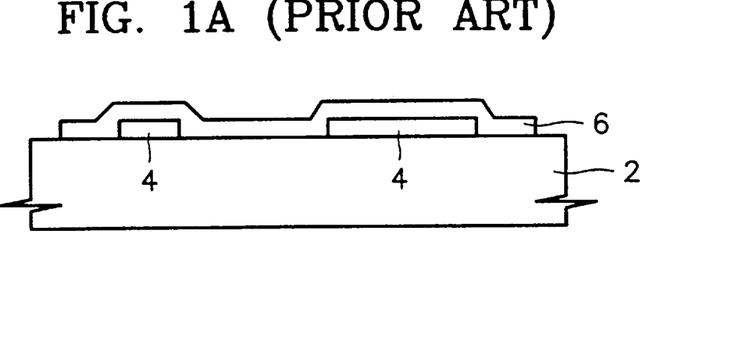
FIGS. 1A–1E are cross-sectional views of intermediate structures which illustrate a method of forming a TFT-LCD display device according to the prior art.

Referring now to FIGS. 1A–1E, a method of forming a TFT-LCD display device according to the prior art will be described. Referring to FIG. 1A, an amorphous silicon layer is deposited to a predetermined thickness on a transparent substrate 2 such as glass substrate by a chemical vapor deposition (CVD) method, resulting in a semiconductor layer used as an active layer. Then, the semiconductor layer is crystallized by irradiating it with a laser for a predetermined number of pulses, and then the semiconductor layer is patterned by a first photolithography process to form a semiconductor layer pattern 6. A doped polysilicon layer or metal layer may be deposited and then patterned to form a reinforcement layer 4 as shown in FIG. 1A, before the semiconductor layer pattern 6 is formed.

Figure 1B:
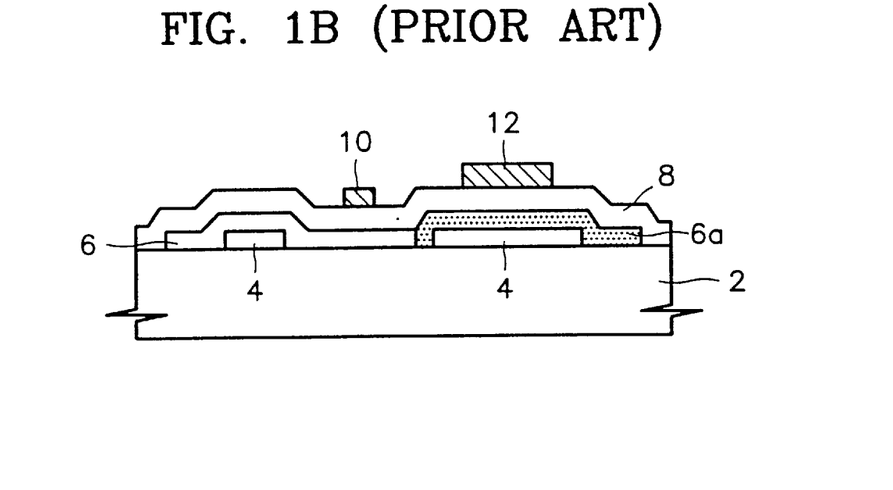

Referring to FIG. 1B, an insulation layer is deposited on the resultant structure having the semiconductor layer pattern 6 to form a gate insulation layer 8, and then a region in which a storage capacitor is to be formed is defined by a second photolithography process. Then, impurity ions are implanted into the defined region of the semiconductor layer by an ion shower doping method, resulting in a doped semiconductor layer pattern 6a in which the storage capacitor is to be formed. Then, a gate metal such as aluminum (Al) is deposited on the resultant structure and then the third photolithography process is performed to form a gate electrode 10 and an upper electrode 12 of the storage capacitor.

Figure 1C:
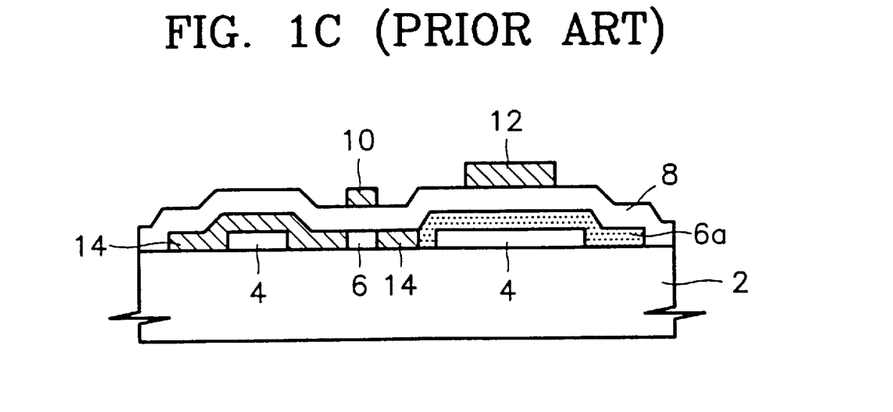

Referring to FIG. 1C, an N-channel TFT region is defined by a fourth photolithography process and then N+ impurities are implanted on the defined region by the ion shower doping method, resulting in an N+-doped semiconductor layer pattern 14. Then, a P-channel TFT region is defined by a fifth photolithography process, and then P+ impurities are doped on the defined P-channel TFT region by the general ion shower doping method, resulting in a P+-doped semiconductor layer pattern (not shown). Subsequently, a laser beam is irradiated on the resultant structure to activate the doped semiconductor layer pattern, resulting in a source/drain 14 of the TFT. Here, the undoped semiconductor layer 6 below the gate electrode 10 becomes a channel region of the TFT.

Figure 1D:
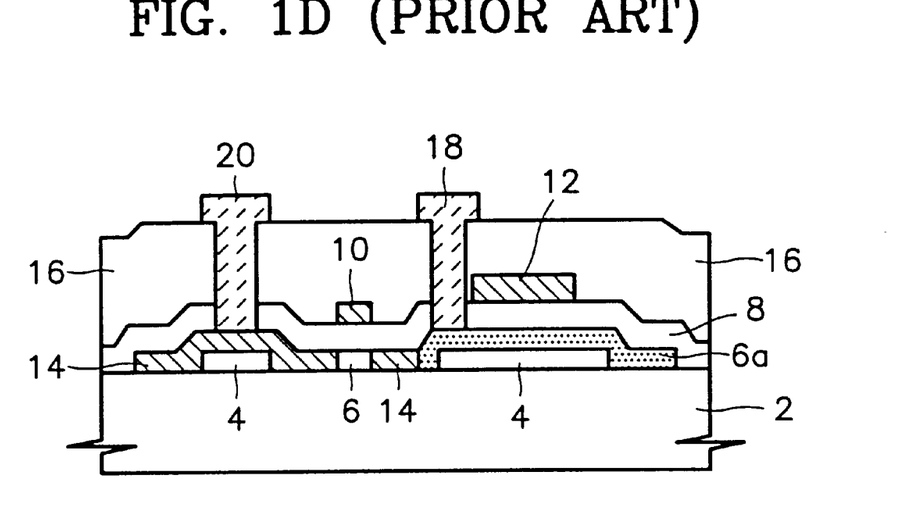
Figure 1E:
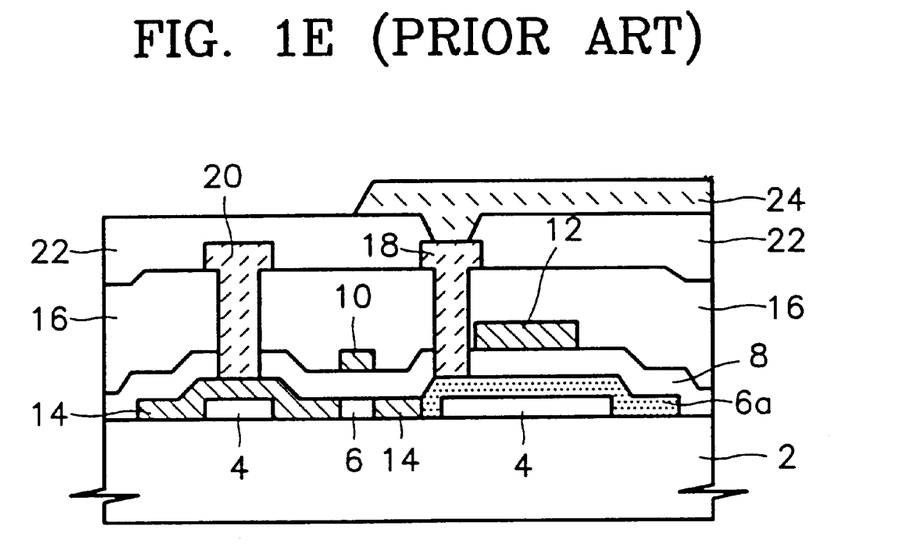

Referring to FIG. 1D, an insulation layer is deposited on the resultant structure having the source/drain 14 to a predetermined thickness to form an interlayer dielectric (ILD) film 16. The ILD film 16 is partially etched by a sixth photolithography process to form a contact hole. Then, a metal layer such as Al is deposited on the resultant structure having the contact hole, and then patterned by a seventh photolithography process to form a data line 20 and a metal layer pattern 18 for a pixel electrode. Referring to FIG. 1E, an insulation layer is deposited on the resultant structure having the data line 20 and the metal layer pattern 18 for the pixel electrode 18 to form a passivation layer 22. Then, the passivation layer 22 is patterned by an eighth photolithography process to form a via hole partially exposing the metal layer pattern 18 for the pixel electrode. Then, a transparent conductive layer such as indium tin oxide (ITO) is deposited on the resultant structure and then patterned by a ninth photolithography process to form a pixel electrode 24.

However, the above-described conventional method for manufacturing the TFT-LCD has the following disadvantages. First, contact resistance is typically high since the thickness of the semiconductor layer used as the active layer is thin. Thus, in order to reduce the contact resistance, the reinforcement layer 4 (see FIG. 1A) is formed on a contact formation region. However, the method for forming the reinforcement layer is complicated and also increases the number of masks. Second, since the step for irradiating with a laser beam is performed after the deposition of the amorphous silicon layer and the ion shower doping process, productivity is low. Third, since about 9–10 photolithography steps are required, manufacturing costs are high.

SUMMARY OF THE INVENTION

It is therefore an object of the present invention to provide improved methods of forming thin-film transistor (TFT) liquid-crystal display (LCD) devices and display devices formed thereby.

It is another object of the present invention to provide methods of forming TFT-LCD display devices having a reduced number of photolithographically defined masking steps and display devices formed thereby.

It is still another object of the present invention to provide methods of forming TFT-LCD display devices having a reduced number of irradiation steps and display devices formed thereby.

These and other objects, features and advantages of the present invention are provided by methods of forming TFT-LCD display devices which include the steps of forming a semiconductor active layer (e.g., amorphous silicon layer (a-Si)) on a face of a transparent substrate and then forming a gate electrode insulating layer on the semiconductor active layer. The gate electrode insulating layer is then patterned to expose a first portion of the semiconductor active layer. A gate electrode is also formed on the gate electrode insulating layer, opposite the semiconductor active layer. In addition, a pixel electrode is formed to be electrically coupled to the exposed first portion of the semiconductor active layer. Preferably, the steps of forming the gate electrode and pixel electrode are performed simultaneously by forming a transparent conductive layer on the patterned gate electrode insulating layer and then patterning the transparent conductive layer to define a transparent gate electrode and a pixel electrode. The transparent conductive layer may comprise a material selected from the group consisting of indium tin oxide (ITO) and zinc oxide (ZnO).

Dopants of first conductivity type are also preferably implanted into the semiconductor active layer (to form source and drain regions therein), using the gate electrode and the pixel electrode as an implant mask. According to one aspect of the present invention, the step of forming the semiconductor active layer is preceded by the steps of forming a first conductive layer (e.g., metal) on the face of the transparent substrate and then patterning the first conductive layer to define a data line and a first storage capacitor electrode. According to another aspect of the present invention, the step of patterning the gate electrode insulating layer comprises etching the gate electrode insulating layer to define a first contact hole therein which exposes the first portion of the semiconductor active layer and exposes the first storage capacitor electrode. The step of patterning the transparent conductive layer also preferably includes patterning the transparent conductive layer to define a second storage capacitor electrode which extends opposite the first storage capacitor electrode, with the gate electrode insulating layer acting as the storage capacitor dielectric region. Steps may also be taken to activate the implanted dopants and crystallize a portion of the semiconductor active layer extending opposite the gate electrode, by performing a single laser annealing step.

According to another embodiment of the present invention, a thin-film transistor display device is provided which contains data lines, storage capacitor electrodes and silicon active layers on and contacting a face of a transparent substrate. With respect to each display cell, a gate electrode insulating layer is provided on a silicon active layer and a gate electrode is provided on the gate electrode insulating layer, opposite the silicon active layer. In addition, the silicon active layer of a display cell is formed on the face of the substrate, between a respective first storage capacitor electrode and a data line. According to a preferred aspect of this embodiment, the silicon active layer electrically contacts sidewalls of the first storage capacitor electrode and the data line. A pixel electrode is also provided on the gate electrode insulating layer. The pixel electrode is electrically coupled to a first end of the silicon active layer and the first storage capacitor electrode. Thus, the silicon active layer is directly and indirectly electrically connected to the first storage capacitor electrode. The direct connection is made between sidewalls of the silicon active layer and the first storage capacitor electrode and the indirect connection is made via the pixel electrode which electrically contacts the silicon active layer at an end thereof and the first storage capacitor at an upper surface thereof. According to another preferred aspect of the present invention, portions of the silicon active layer comprise amorphous silicon which has been crystallized using a single laser annealing technique which also activates source and drain region dopants in the silicon active layer.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 2:
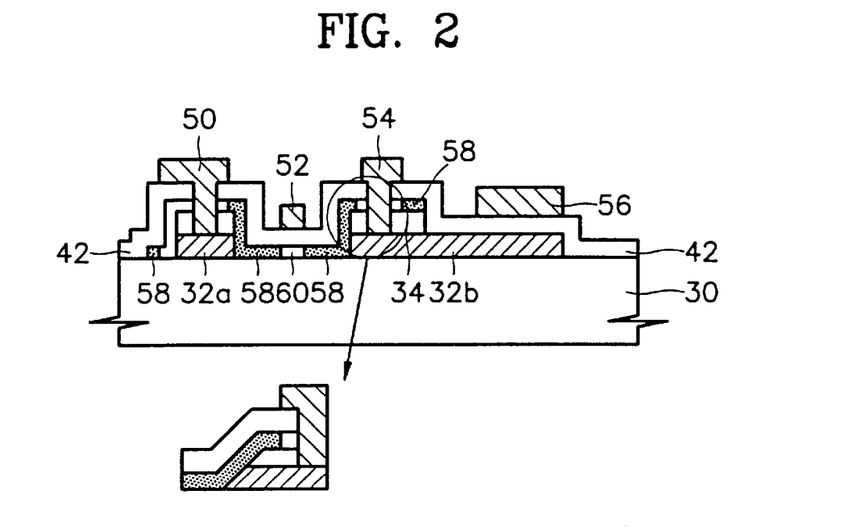
FIG. 2 is a cross-sectional view of a TFT-LCD display device according to an embodiment of the present invention.

Referring now to FIG. 2, a TFT-LCD display device according to a preferred embodiment of the present invention includes a transparent substrate 30 and a data line 32a, a first (e.g., lower) storage capacitor electrode 32b and a semiconductor active layer, on the face of the substrate 30. The semiconductor active layer extends between the data line 32a and the first storage capacitor electrode 32b and electrically contacts the data line 32a and the first storage capacitor electrode 32b at sidewalls thereof. As illustrated by the enlarged highlighted view, the sidewalls of the data line 32a and first storage capacitor electrode 32b are preferably formed at an angle to increase the contact area with the semiconductor active layer. The semiconductor active layer contains doped regions 58 therein which include source and drain regions, and a channel region 60 which extends between the source and drain regions. These doped regions 58 may be formed by ion-implanting dopants into the semiconductor active layer. Here, the angled sidewalls of the data line 32a and the first storage capacitor electrode 32b improve the degree to which the semiconductor active layer uniformly receives the implanted dopants.

A first electrically insulating layer 34 is also provided on the data line 32a and on the first storage capacitor electrode 32b. The first electrically insulating layer 34 preferably has a thickness in a range between about 3,000 and 7,000 Å to limit stray parasitic capacitance between the data line 32a and upper levels of conductive material including a gate line 52. The semiconductor active layer also extends up onto upper surfaces of the first electrically insulating layer 34. A gate electrode insulating layer 42 is also provided on the semiconductor active layer. Contact holes are also provided which extend through the gate electrode insulating layer, the semiconductor active layer and the first electrically insulating layer and expose sidewalls of the semiconductor active layer and upper surfaces of the data line 32a and the first storage capacitor electrode 32b. A transparent conductive layer which may comprises zinc oxide ($ZnO_x$) or indium tin oxide (ITO, $InSnO_x$), for example, is also preferably patterned on the gate electrode insulating layer to define a data line contact 50, a gate electrode 52, a pixel electrode 54 and a second storage capacitor electrode 56. As illustrated, the data line contact 50 extends into a first contact hole and contacts the upper surface of the data line 32a and a sidewall of the semiconductor active layer at the source end thereof. The pixel electrode 54 also extends into a second contact hole and contacts the upper surface of the first storage capacitor electrode 32b and a sidewall of the semiconductor active layer at the drain end thereof.

Figure 3A:
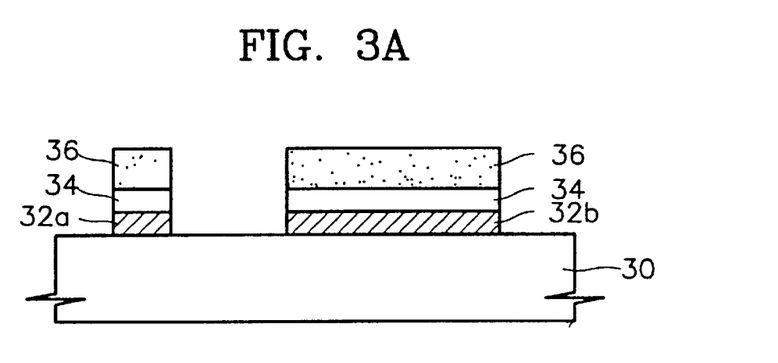
FIGS. 3A–3F are cross-sectional views of intermediate structures which illustrate a method of forming the TFT-LCD display device of FIG. 2, according to another embodiment of the present invention.

Referring now to FIGS. 3A–3F, methods of forming the TFT-LCD display device of FIG. 2 will be described. In particular, FIG. 3A illustrates the steps of forming a first conductive layer 32 (e.g., aluminum) on a face of a transparent substrate 30 (e.g., glass) and then forming a first electrically insulating layer 34 having a thickness in a range between about 300 and 700 nm, on the first conductive layer 32. A layer of photoresist is patterned as a first mask 36 on the first electrically insulating layer 34, and then an etching step is performed to expose the face of the substrate 30 and define a data line 32a and a first storage capacitor electrode 32b having exposed sidewalls. As illustrated best by the enlarged highlighted views of FIGS. 2 and 3F, the exposed sidewalls of the data line 32a and the first storage capacitor electrode 32b are formed at an angle so that their cross-section is in the shape of a trapezoid and subsequent implantation of dopants into a semiconductor active layer can be performed more reliably. As described more fully hereinbelow, the first storage capacitor electrode 32b performs the function of a lower electrode of an TFT-LCD storage capacitor ($C_s$).

Figure 3B:
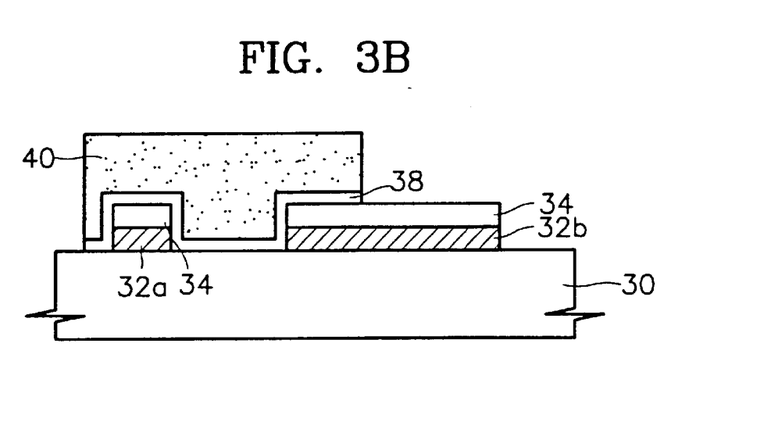
Figure 3C:
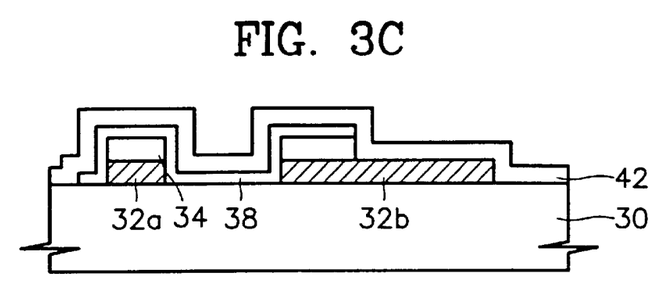

Referring now to FIG. 3B, the first mask 36 is removed and then an amorphous silicon (a-Si) layer is deposited on the first electrically insulating layer 34 and on the face of the substrate 30, as illustrated. The amorphous silicon layer may be deposited using a plasma enhanced chemical vapor deposition (PECVD) technique. A layer of photoresist is patterned as a second mask 40 on the amorphous silicon layer, and then an etching step is performed to define an amorphous silicon active region 38 and expose a portion of the upper surface of the first electrically insulating layer 34. As best illustrated by FIG. 3C, the amorphous silicon active region 38 is then used as a mask to wet etch the first electrically insulating layer 34 and expose a portion of the upper surface of the first storage capacitor electrode 32b. A gate electrode insulating layer 42 (e.g., silicon dioxide) is then formed on the amorphous silicon active region 38, the exposed portion of the upper surface of the first storage capacitor electrode 32b, and on the face of the substrate 30. Here, the portion of the gate electrode insulating layer 42 extending opposite the first storage capacitor electrode 32b comprises the dielectric material of a storage capacitor. Thus, it is unnecessary to perform the separates steps of defining a semiconductor region as a storage capacitor electrode and then implanting dopants into the semiconductor region to reduce the resistivity thereof to acceptable levels.

Figure 3D:
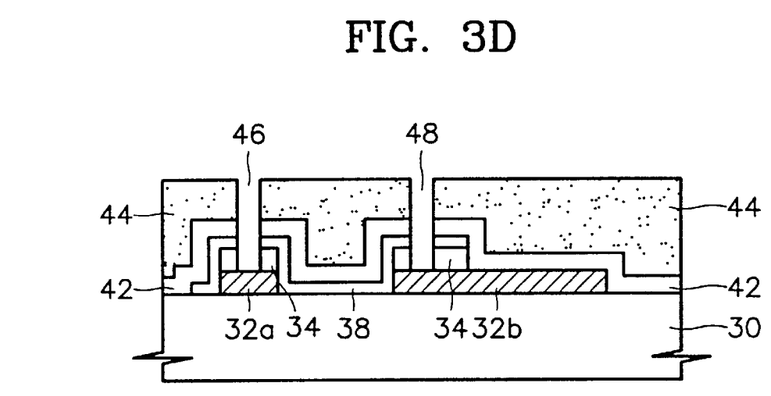
Figure 3E:
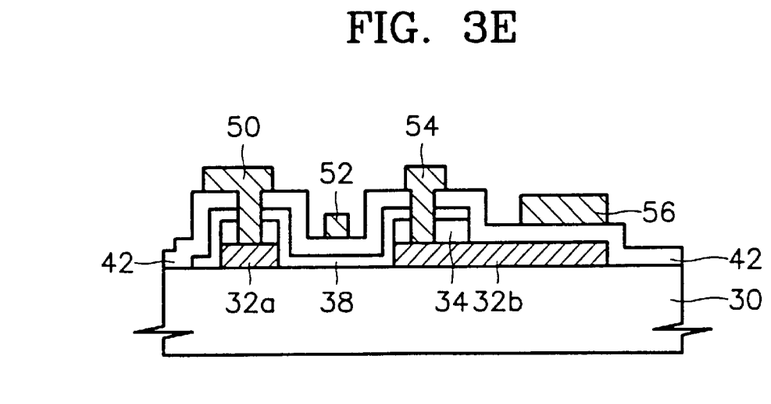

Referring now to FIG. 3D, a layer of photoresist is then deposited and patterned to define a third mask 44 on the gate electrode insulating layer 42. An etching step is then performed to define first and second contact holes 46, 48 which expose an upper surface of the data line 32a and an upper surface of the first storage capacitor electrode 32b. During this etching step, sidewalls of the amorphous silicon active layer 38 are also exposed at first and second ends thereof. As illustrated best by FIG. 3E, a transparent conductive layer comprising a material such as zinc oxide or indium tin oxide, is then formed on the patterned gate electrode insulating layer 42 and in the first and second contact holes. Then, using a fourth mask (not shown), the transparent conductive layer is patterned to define a data line contact 50, TFT gate electrode 52, pixel electrode 54 and a second storage capacitor electrode 56.

Figure 3F:
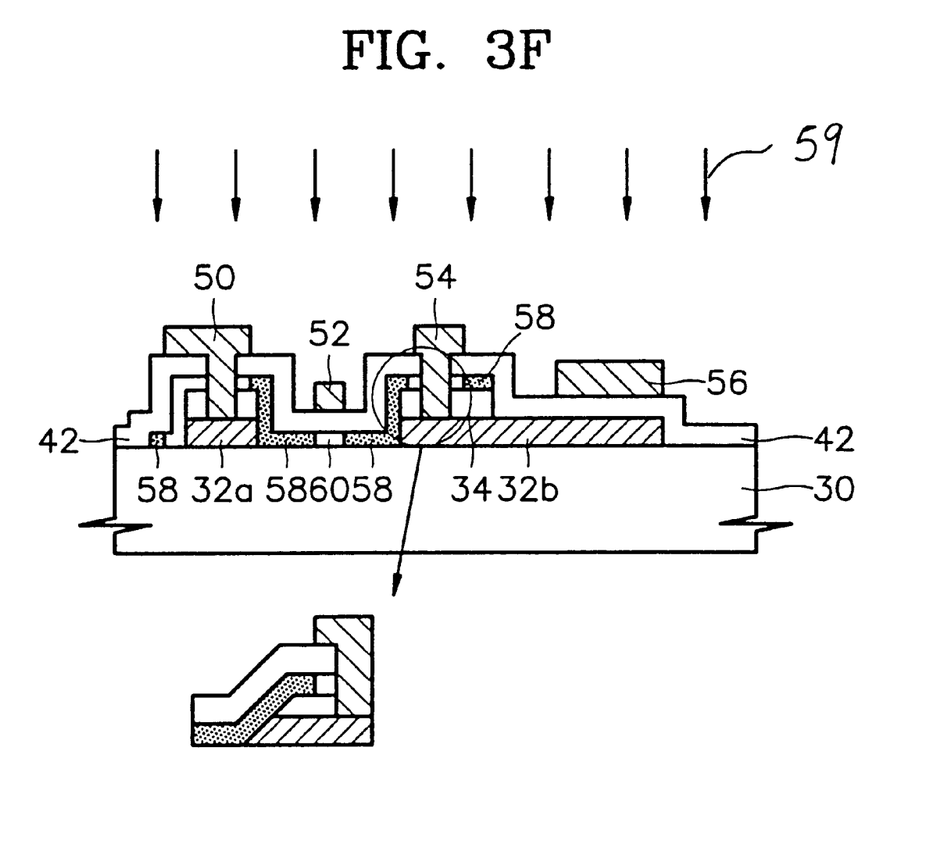

Referring now to FIG. 3F, source and drain regions 58 and a channel region 60 are formed in the amorphous silicon active layer 38 (see FIG. 3E) by implanting N-type impurities 59 at a high dose level into the amorphous silicon active layer 38, using the patterned transparent conductive layer as an implant mask. P-type impurities (not shown) may also be implanted into respective TFT cell regions to define opposite conductivity type TFT devices. Next, the amorphous channel region 60, which does not receive the implanted dopants, is crystallized by performing a laser annealing process which simultaneously activates the dopants in the source and drain regions 58. Thus, crystallization of the channel region 60 and activation of the source/drain region dopants are simultaneously performed by one laser beam irradiation process.

According to the above described TFT-LCD display devices and methods of manufacture according to the present invention, a data line is formed on a lower substrate, and a gate electrode, a data line contact, a pixel electrode and an upper electrode of a storage capacitor are formed from the same transparent conductive layer. These and other aspects of the present invention provide a number of advantages over the prior art including, but not limited to, a reduced number of photolithographically defined masking steps and a reduced number of laser irradiation steps.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of forming a thin-film transistor display device, comprising the steps of:

forming a first conductive layer on a face of a transparent substrate;

patterning the first conductive layer to define a data line having an exposed sidewall and a first storage capacitor electrode having an exposed sidewall;

forming a semiconductor layer on the transparent substrate and in contact with the exposed sidewalls of the data line and the first storage capacitor electrode;

forming a gate electrode insulating layer on the semiconductor layer, opposite the face;

forming a gate electrode on the gate electrode insulating layer, opposite the semiconductor layer; and forming a pixel electrode electrically coupled to the semiconductor layer.

2. The method of claim 1, wherein said step of forming a first conductive layer is followed by the step of forming a first electrically insulating layer on the first conductive layer; and wherein said step of forming a gate electrode insulating layer is followed by the step of etching the gate electrode insulating layer, the semiconductor layer and the first electrically insulating layer in sequence to expose a sidewall of the semiconductor layer and expose an upper surface of the first storage capacitor electrode.

3. The method of claim 1, wherein said steps of forming a gate electrode and a pixel electrode comprise the steps of:

forming a transparent conductive layer on the patterned gate electrode insulating layer; and patterning the transparent conductive layer to define a gate electrode and a pixel electrode.

4. The method of claim 3, wherein the transparent conductive layer comprises a material selected from the group consisting of indium tin oxide and zinc oxide.

5. The method of claim 3, further comprising the step of implanting dopants of first conductivity type into the semiconductor layer, using the gate electrode and pixel electrode as an implant mask.

6. The method of claim 1, wherein said step of forming a semiconductor layer comprises forming a first amorphous silicon layer on the face of the transparent substrate; and wherein the first conductive layer does not comprise amorphous silicon.

7. The method of claim 1, wherein the first conductive layer comprises a metal; and wherein the semiconductor layer comprises silicon.

8. The method of claim 6, further comprising the step of patterning the gate electrode insulating layer to define a first contact hole therein which exposes a sidewall of the semiconductor layer and exposes an upper surface of the first storage capacitor electrode; and wherein said steps of forming a gate electrode and a pixel electrode are performed simultaneously by:

forming a transparent conductive layer on the patterned gate electrode insulating layer and in the first contact hole; and patterning the transparent conductive layer to define a gate electrode and define a pixel electrode electrically contacting the exposed sidewall of the semiconductor layer and electrically contacting the upper surface of the first storage capacitor electrode.

9. The method of claim 8, wherein said step of patterning the transparent conductive layer comprises patterning the transparent conductive layer to define a second storage capacitor electrode extending opposite the first storage capacitor electrode.

10. The method of claim 9, further comprising the step of implanting dopants of first conductivity type into the semiconductor layer, using the gate electrode, pixel electrode and second storage capacitor electrode as an implant mask.

11. The method of claim 8, wherein said step of forming a first conductive layer on the face of the transparent substrate is followed by the step of forming a first electrically insulating layer on the first conductive layer; and wherein said step of patterning the first conductive layer comprises patterning the first electrically insulating layer and the first conductive layer to expose the face of the transparent substrate.

12. The method of claim 11, wherein said step of forming a gate electrode insulating layer is preceded by the step of etching the first electrically insulating layer to expose the upper surface of the first storage capacitor electrode, using the semiconductor layer as an etching mask.

13. The method of claim 12, wherein said step of patterning the gate electrode insulating layer comprises etching the gate electrode insulating layer, the semiconductor layer and the first electrically insulating layer to expose the data line and the first storage capacitor electrode.

14. The method of claim 13, wherein said step of patterning the transparent conductive layer comprises patterning the transparent conductive layer to define a second storage capacitor electrode extending opposite the first storage capacitor electrode.

15. A method of forming a thin-film transistor display device, comprising the steps of:

forming a first conductive layer on a face of a transparent substrate;

forming a first electrically insulating layer on the first conductive layer, opposite the face;

patterning the first conductive layer to define a data line and a first storage capacitor electrode having exposed sidewalls;

forming an amorphous silicon layer on the face of the transparent substrate and in electrical contact with the exposed sidewalls of the data line and the first storage capacitor electrode;

etching the first electrically insulating layer to expose a portion of the first storage capacitor electrode, using the amorphous silicon layer as an etching mask;

forming a gate electrode insulating layer on the amorphous silicon layer and on the exposed portion of the first storage capacitor electrode;

etching the gate electrode insulating layer, the amorphous silicon layer and the first electrically insulating layer, to define a first contact hole which exposes the data line and a first sidewall of the amorphous silicon layer, and define a second contact hole which exposes the first storage capacitor electrode and a second sidewall of the amorphous silicon layer;

forming a transparent conductive layer on the gate electrode insulating layer and in the first and second contact holes so that the transparent conductive layer contacts the first and second sidewalls of the amorphous silicon layer; and patterning the transparent conductive layer to define a data line contact in the first contact hole, a gate electrode extending opposite the amorphous silicon layer, a pixel electrode in the second contact hole and a second storage capacitor electrode which extends opposite the first storage capacitor electrode.

16. The method of claim 15, wherein the first conductive layer comprises a metal; and wherein the semiconductor layer comprises silicon.

17. The method of claim 15, wherein said step of patterning the transparent conductive layer is followed by the step of implanting dopants of first conductivity type into the amorphous silicon layer, using the patterned transparent conductive layer as an implant mask.

18. The method of claim 17, further comprising the steps of annealing the amorphous silicon layer to activate the implanted dopants therein and recrystallize a portion thereof extending opposite the gate electrode.

19. A thin-film transistor display device, comprising:

a transparent substrate having a face thereon;

a data line comprising a first material on the face;

a first storage capacitor electrode comprising the first material on the face;

a semiconductor active layer comprising a second material different from the first material on the face, said semiconductor active layer extending between and contacting a sidewall of the data line and a sidewall of the first storage capacitor electrode;

a gate electrode insulating layer on the semiconductor active layer, opposite the face;

a gate electrode on the gate electrode insulating layer, opposite the semiconductor active layer; and a pixel electrode electrically coupled to a first sidewall of the semiconductor active layer and the first storage capacitor electrode.

20. The display device of claim 19, wherein the gate electrode comprises a material selected from the group consisting of indium tin oxide and zinc oxide.

21. The display device of claim 19, further comprising a data line contact electrically contacting the data line and a second sidewall of the semiconductor active layer.

22. The display device of claim 21, further comprising a second storage capacitor electrode on the gate electrode insulating layer, opposite the first storage capacitor electrode.

23. The display device of claim 22, wherein the second storage capacitor electrode comprises a material selected from the group consisting of indium tin oxide and zinc oxide.

24. The display device of claim 20, further comprising a data line contact electrically contacting the data line and a second sidewall of the semiconductor active layer.

25. The display device of method of claim 24, wherein the semiconductor active layer comprises source and drain regions therein which are self-aligned to the data line contact, the gate electrode and the pixel electrode.

26. The display device of claim 25, wherein the data line contact and pixel electrode each comprise a material selected from the group consisting of indium tin oxide and zinc oxide.

27. The display device of claim 26, wherein the semiconductor active layer comprises recrystallized amorphous silicon.

28. A thin-film transistor display device, comprising:

a transparent substrate having a face thereon;

a data line comprising a first material, on the face;

a first storage capacitor electrode comprising the first material, on the face;

a silicon active layer on the face, said silicon active layer contacting a sidewall of the data line and a sidewall of the first storage capacitor electrode;

a gate electrode insulating layer on the silicon active layer, opposite the face;

a gate electrode on the gate electrode insulating layer, opposite the silicon active layer; and a pixel electrode electrically coupled to the silicon active layer and the first storage capacitor electrode;

wherein the silicon active layer contains source and drain regions therein which are self-aligned to the gate electrode and the pixel electrode.

29. The display device of claim 28, wherein the gate electrode and the pixel electrode comprise a transparent material selected from the group consisting of indium tin oxide and zinc oxide.

30. The display device of claim 29, wherein the data line and first storage capacitor electrode comprise aluminum; and wherein the silicon active layer comprises recrystallized amorphous silicon.

* * * * *